United States Patent
Ruohio

(10) Patent No.: US 12,473,963 B2
(45) Date of Patent: Nov. 18, 2025

(54) DRIVE MECHANISM IN PARTICULAR FOR MAYTAGGING OPERATION

(71) Applicant: Murata Manufacturing Co., Ltd., Nagaokakyo (JP)

(72) Inventor: Jaakko Ruohio, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/931,710

(22) Filed: Oct. 30, 2024

(65) Prior Publication Data
US 2025/0052304 A1    Feb. 13, 2025

Related U.S. Application Data

(63) Continuation of application No. PCT/IB2022/062909, filed on Dec. 30, 2022.

(30) Foreign Application Priority Data

May 3, 2022   (FI) .................................. 20225379

(51) Int. Cl.
  F16H 27/06    (2006.01)
  G01C 19/38    (2006.01)

(52) U.S. Cl.
  CPC ............. *F16H 27/06* (2013.01); *G01C 19/38* (2013.01)

(58) Field of Classification Search
  CPC .......... F16H 27/06; G01C 19/38; G01C 19/00
  USPC .................................................... 74/436, 820
  See application file for complete search history.

(56) References Cited

U.S. PATENT DOCUMENTS

| | | | | |
|---|---|---|---|---|
| 3,234,819 A | * | 2/1966 | Zuse | ........................ F16H 37/00 |
| | | | | 74/436 |
| 3,605,517 A | * | 9/1971 | Seragnoli | ................ F16H 27/06 |
| | | | | 74/820 |
| 3,606,526 A | | 9/1971 | Smith | |
| 3,638,510 A | | 2/1972 | Staller | |

FOREIGN PATENT DOCUMENTS

CN          103063205 A       4/2013

OTHER PUBLICATIONS

International Search Report received for PCT Patent Application No. PCT/IB2022/062909, mailed on Mar. 23, 2023, 3 pages (English translation only).

Prikhodko et al., "What is MEMS Gyrocompassing? Comparative Analysis of Maytagging and Carouseling", Journal of Microelectromechanical Systems, IEEE Service Center, US, vol. 22, No. 6, XP011532835, Dec. 1, 2013, pp. 1257-1266.

* cited by examiner

*Primary Examiner* — Victor L Macarthur
(74) *Attorney, Agent, or Firm* — ArentFox Schiff LLP

(57) ABSTRACT

A device includes multiple circular drive wheels rotationally connected, with two featuring drive pins. A drive motor, attached to one of these wheels, continuously rotates it, thereby rotating all connected wheels. The device has a driven wheel with two opposing radial slots that enable intermittent rotation around its axis as drive pins engage alternately, changing rotation direction in consecutive phases. The device also includes a first gearing wheel linked to the driven wheel and a second gearing wheel coupled to the first. A payload is connected to this second gearing wheel, which, with the payload, rotates 160-200 degrees in one direction when a drive pin engages one radial slot.

20 Claims, 7 Drawing Sheets

DRIVE MECHANISM IN PARTICULAR FOR MAYTAGGING OPERATION

CROSS REFERENCE TO RELATED APPLICATIONS

This application is a continuation of International Application No. PCT/IB2022/062909, filed Dec. 30, 2022, which claims priority to Finland Patent Application No. 20225379, filed May 3, 2022, the contents of each of which are hereby incorporated by reference in their entirety.

FIELD

The present disclosure relates to a method and a system related to a mechanical drive apparatus. More particularly, the disclosure relates to a Geneva drive system configured to intermittently rotate a payload for facilitating a maytagging operation.

BACKGROUND

Maytagging refers to a mitigation process used to remove offset of an inertial sensor by flipping the measurement axis of the inertial sensor by ±180 degrees. Difference of the measurements in the two different (opposite) directions gives twice the actual sensed signal and enables nulling the offset.

Maytagging may be used in the application of gyrocompassing, which refers to finding of true north by means of gyroscopes measuring in-plane components of the angular velocity of the Earth. Maytagging in gyrocompassing applications is also referred to as two-point gyrocompassing. North finding based on micromachined gyroscopes, such as microelectromechanical (MEMS) gyroscopes is an attractive possibility with numerous applications.

Flipping of measurement axis of an inertial sensor by 180 degrees may be implemented by a stepper motor or a servo motor. However, stepper and servo motors and their supporting control electronics are costly and require high electrical power to operate that could lead to elevated temperatures inside a closure containing one or more gyroscopes. Elevated temperatures may degrade the performance of inertial sensors, for example by increasing required stabilization time after power-on.

SUMMARY OF INVENTION

An object of the present disclosure is to provide an apparatus so as to solve the problem of intermittently flipping an inertial sensor, such as a gyrocompass, preferably by ±180 degrees.

The present disclosure is based on the idea of utilizing a Geneva drive mechanism for flipping a payload comprising the inertial sensor preferably by ±180 degrees. A Geneva drive is also referred to in the literature as a Maltese cross. The mechanical drive apparatus applies the operation principle of a Geneva drive to achieve the wanted payload rotation. Rotating motion of the payload is intermittent meaning that the payload is stationary between two consecutive rotations which occur alternately in opposite directions. The operation principle is easily adjustable for other rotation angles, for example any selected angle in the range between 160 to 200 degrees.

According to a first aspect, a drive mechanism is provided. The mechanism comprises two or four circular drive wheels rotationally coupled to each other. Two of the rotating drive wheels have a drive pin. The mechanical drive mechanism comprises a drive motor coupled to one of the drive wheels. The drive motor is configured to continuously rotate the respective drive wheel, and consequently all other drive wheels. The drive mechanism comprises a driven wheel having two outwardly opening radial slots arranged symmetrically on opposite sides of the driven wheel. The driven wheel is configured to be driven into an intermittent rotation motion about its central axis by drive pins of the two rotating drive wheels alternately engaging with one of the radial slots. Direction of the intermittent rotation motion alternates between two consecutive rotation phases. The mechanism comprises a first gearing wheel uniaxially coupled to the driven wheel and a second gearing wheel rotationally coupled to the first gearing wheel. A payload is uniaxially coupled to the second gearing wheel. The second gearing wheel and the payload are configured to be rotated in the range of 160 to 200 degrees, preferably in the range of 170 to 190 degrees, more preferably by 180 degrees in a first direction during engagement of a first drive pin of a first drive wheel with one of the two outwardly opening radial slots. The second gearing wheel and the payload are configured to be rotated in the range of 160 to 200 degrees, preferably in the range of 170 to 190 degrees, more preferably by 180 degrees in a second direction opposite to the first direction during engagement of a second drive pin of a second drive wheel with the other one of the two outwardly opening radial slots.

According to a second aspect, the driven wheel, the first gearing wheel, the second gearing wheel and the payload are stationary between intermittent rotations.

According to a third aspect, the first drive wheel and the second drive wheel each comprise a blocking disc configured to disable rotation motion of the driven wheel between intermittent rotations.

According to a fourth aspect, the blocking disc comprises a convex portion configured to engage with a respective concave portion of the driven wheel between said intermittent rotations for temporarily disabling rotation motion of the driven wheel.

According to a fifth aspect, gearing ratio of the first and second gearing wheels is 2:1 and wherein duty cycle of the drive mechanism is 50%.

According to another aspect, an inertial sensor apparatus is provided that comprises the drive mechanism according to any one of the above aspects. The drive mechanism is configured to rotate the payload by 180 degrees during each rotation period for maytagging at least one inertial sensor comprised in the payload.

According to a further aspect, the payload comprises a MEMS gyroscope and/or a MEMS accelerometer.

According to some aspects, the inertial sensor apparatus is a MEMS gyrocompass.

The present disclosure has the advantage that slip rings for power and communication are not needed. The switching arrangement can be made compact, such that it needs only about 2 to 3 times the lateral area needed for the payload. The design of the invented mechanism can be easily adjusted to implement rotation angles differing from the preferred angle of 180 degrees typically used for maytagging purposes.

BRIEF DESCRIPTION OF DRAWINGS

In the descriptions that follow, like parts are marked throughout the specification and drawings with the same numerals, respectively. The drawings are not necessarily drawn to scale and certain drawings may be illustrated in exaggerated or generalized form in the interest of clarity and conciseness. The disclosure itself, however, as well as a mode of use, further features and advances thereof, will be understood by reference to the following detailed description of illustrative implementations of the disclosure when read in conjunction with reference to the accompanying drawings, wherein.

DETAILED DESCRIPTION

Figure 1:
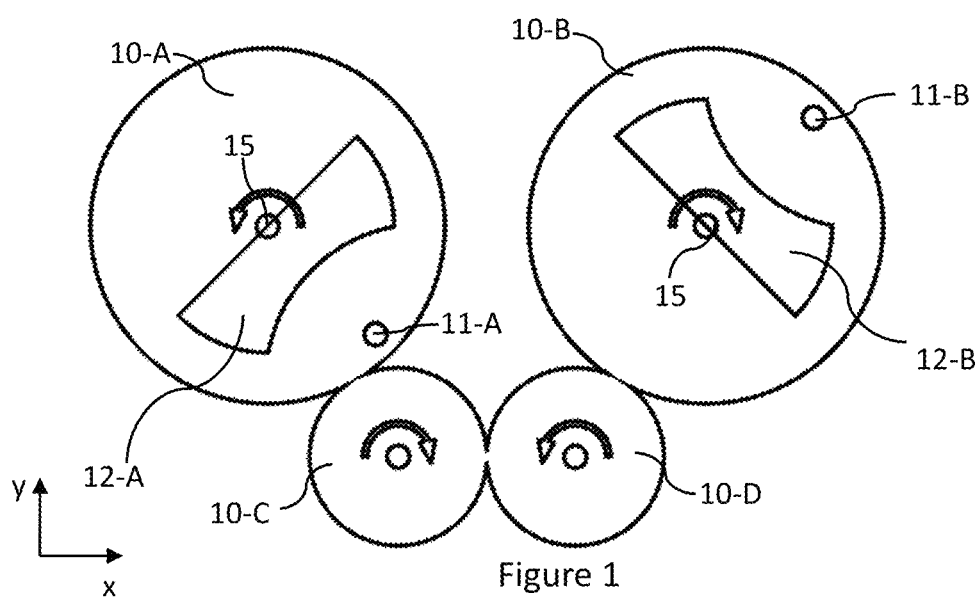
FIG. 1 illustrates drive wheels in accordance with aspects of the present disclosure.

Hereinbelow, aspects of the present disclosure will be described. In a following description of the drawings, the same or similar components will be represented with use of the same or similar reference characters. The drawings are exemplary, sizes or shapes of portions are schematic, and technical scope of the present disclosure should not be understood with limitation to the aspects.

Unless otherwise stated, in the following figures, the Geneva drive mechanism is shown as a projection in which a plane determined by circular disc-formed drive wheels (10) is parallel with the drawing sheet (xy-plane) and direction towards the reader (z-axis) is referred to with terms "up", "upwards", "above" and like and direction away from the reader is "down" and "downwards", "below" and like. This projection used for illustration purposes should not considered limiting position of a physical device.

The FIG. 1 illustrates drive wheels according to an aspect of the disclosure as seen from above, i.e. in direction of rotation axes of the drive wheels. According to an aspect of the disclosure, there are four circular rotating drive wheels (10) rotationally coupled to each other and thus rotating in synchronized manner. Drive wheels are preferably formed as essentially flat discs with non-zero thickness and all drive wheels are preferably disposed mutually on the same horizontal plane. Each drive wheel is essentially circular and rotates about its own central axis. A first drive wheel (10-A) and a second drive wheel (10-B) both have a drive pin (11-A; 11-B) fixedly attached to the drive wheel at a predetermined distance from the central axis (15) of the respective drive wheel (10-A; 10-B). The first and second drive wheels (10-A, 10-B) have equal radiuses. Two smaller drive wheels (10-C, 10-D) in this aspect convey rotation between the first and second drive wheels (10-A, 10-B) while enabling maintaining a distance between outer circumferences of the first and second drive wheels. As a result, the first and second drive wheels (10-A, 10-B) rotate in mutually opposite directions as illustrated by the curved arrows. Radiuses of the two smaller drive wheels (10-C, 10-D) are preferably mutually equal and smaller than radius of the first and second drive wheels (10-A, 10-B). Drive pins (11-A; 11-B) are disposed on one side of the respective drive wheel and extending preferably upwards, orthogonally away from the plane formed by upper surfaces of the drive wheels (10).

Both the first and second drive wheel (10-A, 10-B) further preferably comprises a blocking disc (12-A; 12-B) disposed on one face of the respective drive wheel. The blocking disc (12-A; 12-B) extends upwards from the plane formed by upper surfaces of the drive wheels, in other words it extends in the same direction as the respective drive pin (10).

Figure 2:
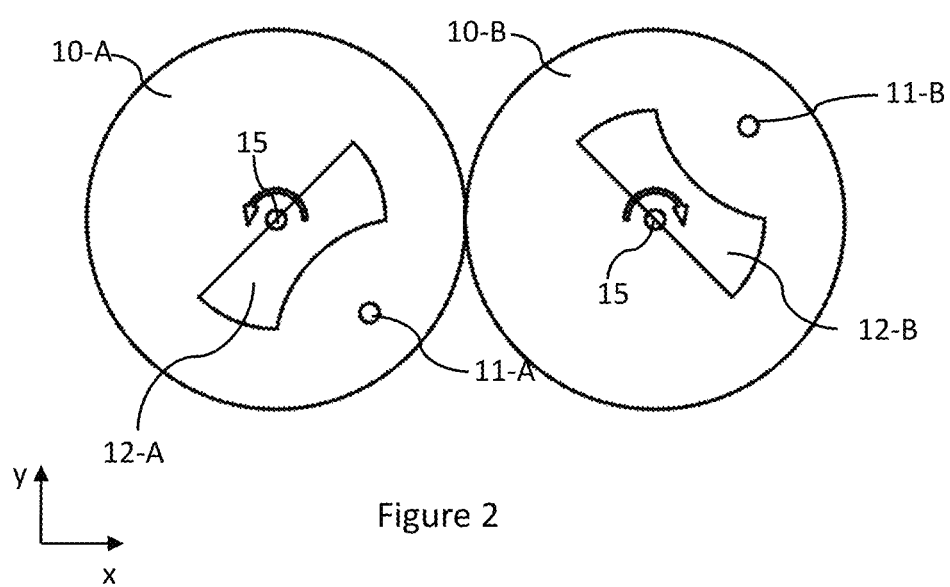
FIG. 2 illustrates drive wheels in accordance with aspects of the present disclosure.

The FIG. 2 illustrates drive wheels according to an aspect of the disclosure. In this aspect, there are only two drive wheels (10-A, 10-B). The first drive wheel (10-A) and second drive wheel (10-B) are directly and rotationally coupled to each other, thus configured to rotate in mutually opposite directions. The first and second drive wheels (10-A, 10-B) have equal radiuses. This configuration enables a simpler drive wheel construction but leaves no space on the direct line between the central axes (15) of the two drive wheels for additional functional parts. As in the aspect described above, both the first and second drive wheel (10-A, 10-B) preferably comprise blocking discs (12-A, 12-B).

For causing all drive wheels (10) to rotate continuously, it is sufficient that one of the drive wheels (10) is rotated. Rotation is preferably implemented by a continuously rotating simple electric motor that is coupled to one of the drive wheels to provide motion.

Figure 3:
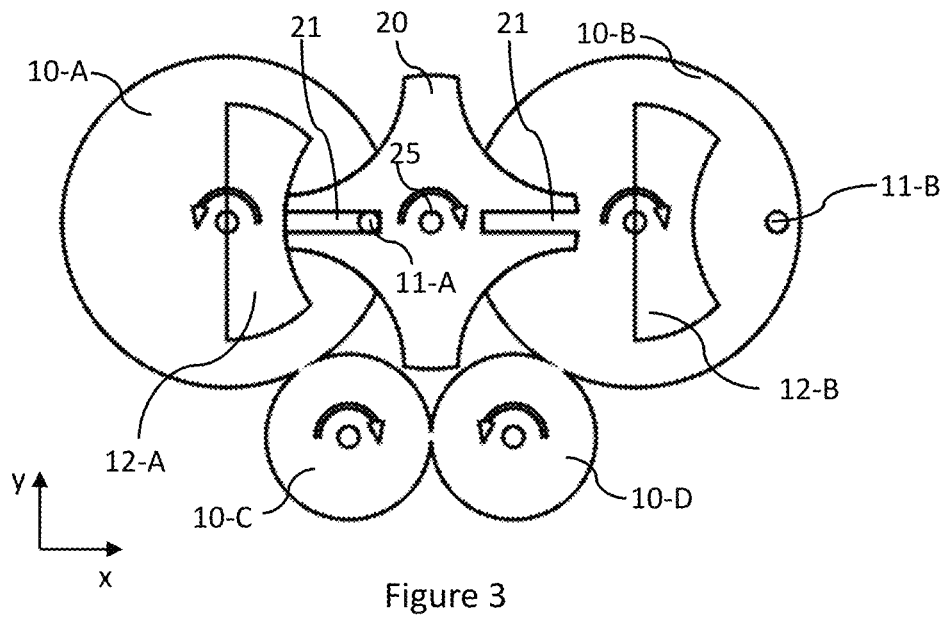
FIG. 3 illustrates drive wheels and a driven wheel in accordance with aspects of the present disclosure.

The FIG. 3 illustrates drive wheels (10) and a driven wheel (20). According to an aspect of the disclosure, the central axis (25) of the driven wheel (20) is placed on the direct line between central axes (15) of the first and second drive wheels (10-A, 10-B). The driven wheel (20) is disposed in a plane that is parallel to the plane determined by the drive wheels and preferably coplanar with the blocking discs (12-A, 12-B). In this example, the driven wheel (20) is disposed above the upper surfaces of the drive wheels (10) (towards the viewer) such that the drive pins (11) can engage with the driven wheel (20) for intermittently rotating it.

The driven wheel (20) comprises two outwardly opening radial slots (21) arranged symmetrically on two opposite sides of the driven wheel (20). The driven wheel (20) is configured to be driven about its central axis (25) alternately and intermittently by drive pins (11-A, 11-B) of the first and second drive wheels (10-A, 10-B). Rotation of the driven wheel (20) occurs while one of the driving pins is engaged with one of the radial slots (21), which causes the driven wheel (20) to rotate about its central axis (25) in the opposite direction in comparison to the respective drive wheel (10) that is currently engaged with the driven wheel (20) via its driving pin (11).

Purpose of the blocking disc (12-A; 12-B) is to enable locking of the driven wheel in a fixed position between intermittent rotating phases, when neither of the two drive pins (11-A, 11-B) is engaged with one of the radial slots (21).

Figure 4:
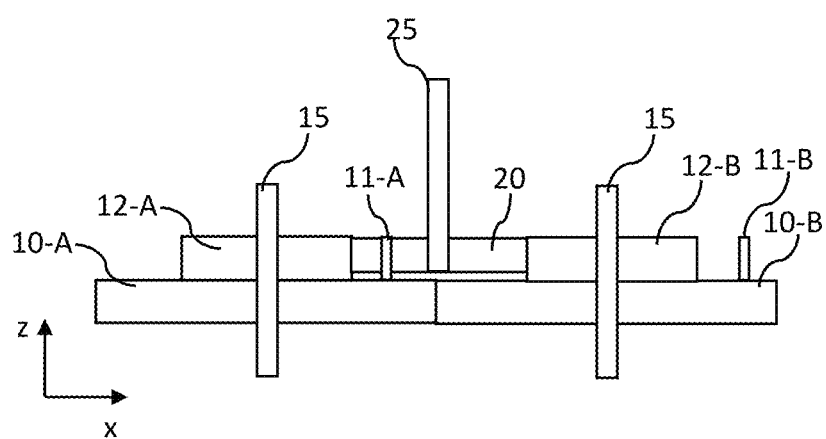
FIG. 4 illustrates a side view cross section of drive wheels and a driven wheels in accordance with aspects of the present disclosure.

The FIG. 4 shows a simplified side view cross section of drive wheels (10-A, 10-B) and driven wheel (20) according to an aspect of the disclosure. The drawing is not in scale. For enabling disposing central axis (25) of the driven wheel on the direct line between central axes (15) of the drive wheels (10-A, 10-B) in similar manner to the aspect described above, the axis (25) of the driven wheel (20) extends away from the plane of the drive wheels (10-A, 10-B). Driving pins (11-A, 110-B) extend above the drive wheel (10-A, 10-B) in the z-axis direction on the same face as the blocking discs (12-A, 12-B).

Figure 5:
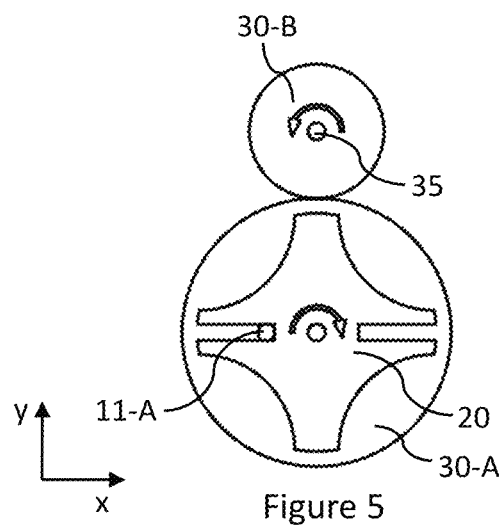
FIG. 5 illustrates the driven wheel and gearing wheels in accordance with aspects of the present disclosure.

The FIG. 5 illustrates the driven wheel (20) and gearing wheels (30-A, 30-B). Drive wheels (10) have been omitted from the FIG. 5 for clarity. A drive pin (11-A) is however illustrated. Gearing wheels (30) are preferably circular and disc-shaped and disposed in a plane that is parallel with the plane of the drive wheels. In this example, gearing wheels (30) are disposed below the driven wheel (20) and preferably also below the plane of the drive wheels.

Purpose of the gearing wheels is to determine angle of the intermittent rotation motion of the payload. In an aspect of the disclosure, the gearing wheels cause the preferred 180-degree rotation motion driven by a 90-degree rotation motion of the driven wheel (20).

According to aspects of the present disclosure, gearing wheels (30) comprise a first gearing wheel (30-A) which is uniaxial with the driven wheel (20). A second gearing wheel (30-B) is rotationally coupled to the first gearing wheel (30-A). Radius of the second gearing wheel (30-B) is smaller than the radius of the first gearing wheel (30-A). In the shown example, gearing ratio of the gearing wheels is 2:1. Alternative gearing ratios are applicable for causing rotation motions of the second gearing wheel (30-B) that differ from the exemplary 180-degrees. If the driven wheel rotates an angle other than 90 degrees, the gearing ratio can be used to tune the rotating of the payload to the preferred 180 degrees, or to another rotation angle.

Figure 6:
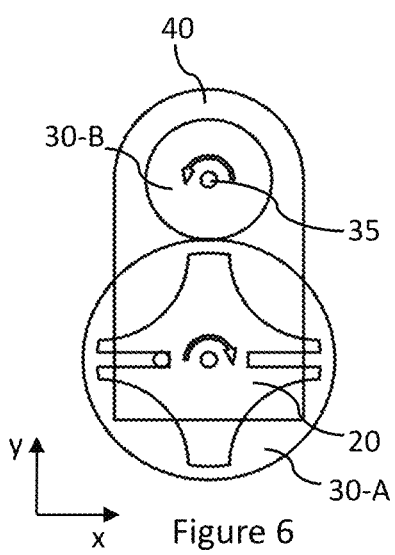
FIG. 6 illustrated the driven wheel, gearing wheels and a payload in accordance with aspects of the present disclosure.

The FIG. 6 illustrated the driven wheel (20), gearing wheels (30-A, 30-B) and a payload (40). The payload (40) is fixed to the second gearing wheel (30-B) and/or the rotation axis (35) thereof such that the payload (40) rotates uniaxially with the second gearing wheel (35). The payload (40) is preferably disposed in a plane that is parallel with the gearing wheels as well as the drive wheels and the driven wheel but has a non-zero distance from any of these such that the payload (40) can rotate without colliding with any of the wheels or axis thereof.

FIGS. 7a to 7f illustrate operation of the Geneva drive mechanism over a full operation cycle. The first drive wheel (10-A) and the second drive wheel (10-B) rotate 360 degrees during the operation cycle.

This exemplary operation cycle takes time of 8*dt, in which dt refers to any selected time unit. The payload (40) is stationary for 2*2*dt=4*dt, while its rotation operation to each direction takes 2*dt. Thus, duty cycle of this exemplary aspect is 50%. Duty cycle can be increased by increasing the gearing ratio and/or moving the drive pin (11-A, 11-B) location closer to the respective rotation axis (15) of the rotating drive wheels (10-A, 10-B). In this example, rotation operation can also be referred to as a flipping operation, since the payload (40) is flipped about the rotation axis (35) by 180 degrees.

Figure 7A:
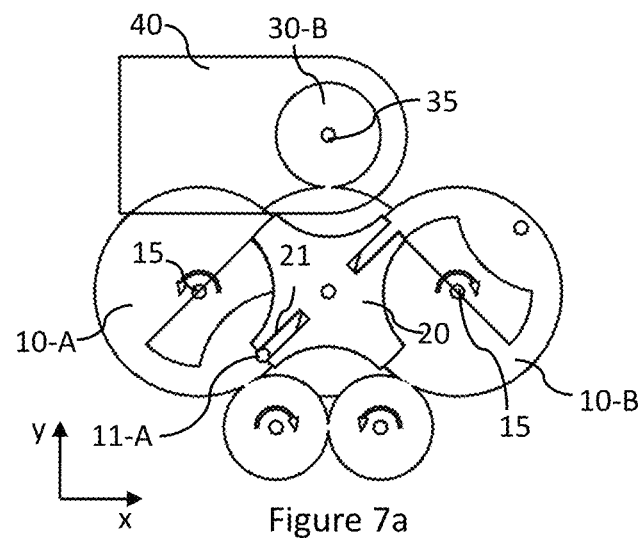
FIGS. 7a, 7b, 7c, 7d, 7e, 7f and 7g illustrate operation of the Geneva drive mechanism in accordance with aspects of the present disclosure.

The FIG. 7a illustrates a first phase at moment t=t0+dt, in which the payload is stationary. At this moment, the drive pin (11-A) of the first drive wheel (10-A) is just about to engage with one of the radial slots (21) of the driven wheel (20), which initiates a rotation phase of the driven wheel (20).

Figure 7B:
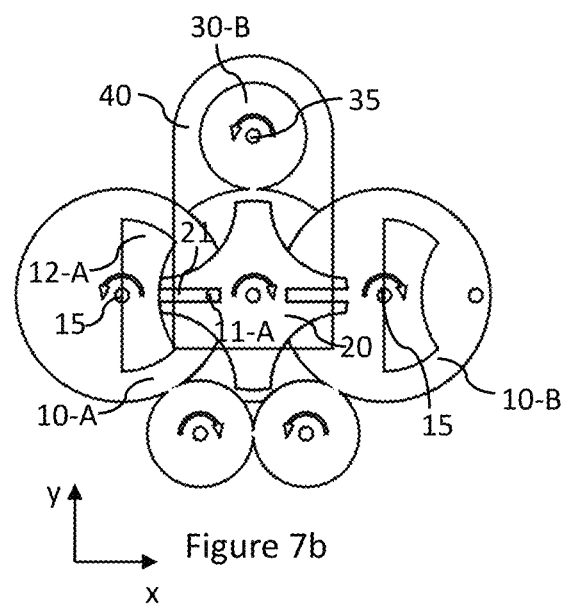

The FIG. 7b illustrates a second phase at moment t=t0+2dt. The drive pin (11-A) of the first drive wheel (10-A) rotates the driven wheel (20), driving the first gearing wheel (30-A) to a clockwise rotating motion, which is conveyed to a counterclockwise rotation motion of the second gearing wheel (30-B) that rotates the payload (40). At the shown point of time, the counterclockwise rotation motion of the payload (40) about its rotation axis (35), caused by the drive pin (11-A) of the first drive wheel (10-A) engaging to the radial slot (21) of the drive wheel (20), is half-way through, and this rotation continues as long as the drive pin (11-A) remains engaged with the radial slot (21). A concave portion at the outer circumference of the blocking disc (12-A) of the first drive wheel (10-A) allows undisturbed rotation of the driven wheel (20).

Figure 7C:
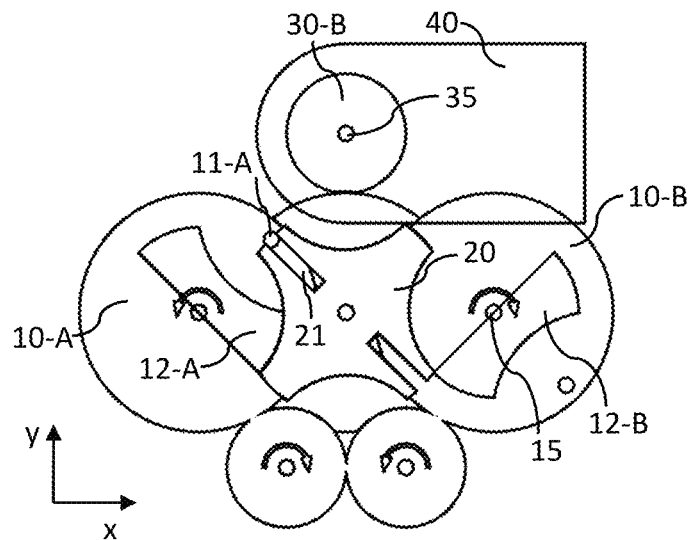

The FIG. 7c illustrates a third phase at moment t=t0+3dt. The drive pin (11-A) of the first drive wheel (10-A) is just about to exit the radial slot (21) of the driven wheel (20), which causes the driven wheel (20) to stop. Also gearing wheels (30-A, 30-B) stop, which causes the payload (40) to come to a stop in its current position, which is flipped, in other words rotated 180 degrees from the initial position of the payload (40) shown in the FIG. 7a. At this phase, a convex portion of the outer circumference of the blocking disc (12-A) of the first drive wheel (10-A) has already engaged with a respective concave portion of the driven wheel (20), and convex portion of the blocking disc (12-B) of the second drive wheel (10-B) is just about to engage with an opposite concave portion of the driven wheel (20). The blocking discs (12-A, 12-B) lock the driven wheel (20) temporarily in a fixed position.

Figure 7D:
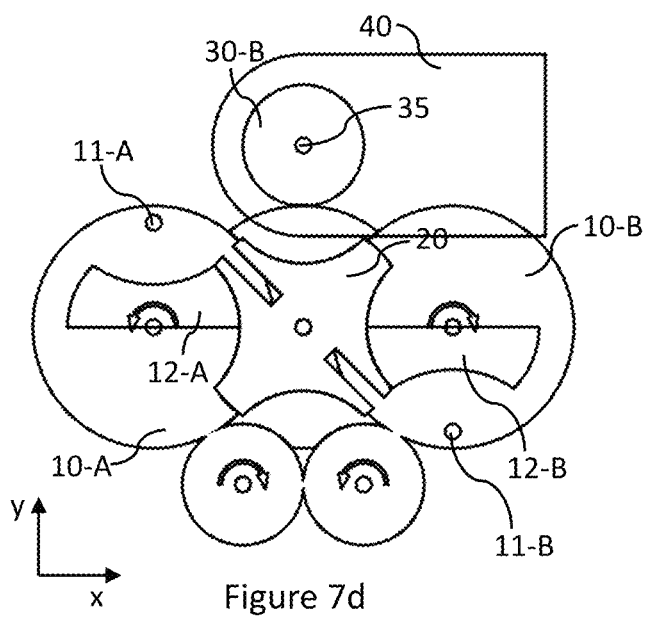

The FIG. 7d illustrates a fourth phase at moment t=t0+4dt, in which neither of the drive pins (11-A, 11-B) is engaged with the radial slots (21) of the driven wheel (40). Drive wheels (10) continue their rotating motion, but payload (40) is not rotated. Convex portions of both blocking discs (12-A, 12-B) are engaged with two opposite concave portions of the driven wheel (20) to disable its movement.

Figure 7E:
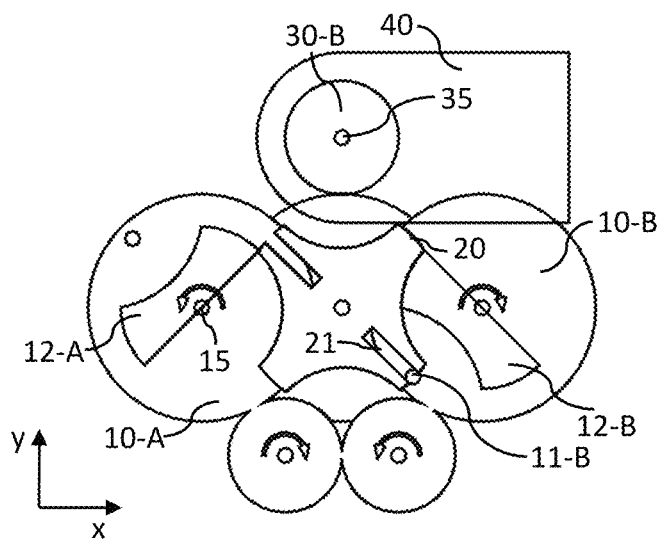

The FIG. 7e illustrates a fifth phase at moment t=t0+5dt. The stationary period of the payload (40) is about to end, when the drive pin (11-B) of the second drive wheel (10-B) engages with the other radial slot (21) of the drive wheel (20). Also convex portion of the blocking disc (12-A) of the first drive wheel (10-A) disengages from contact with the driven wheel (20), thus enabling rotation thereof.

Figure 7F:
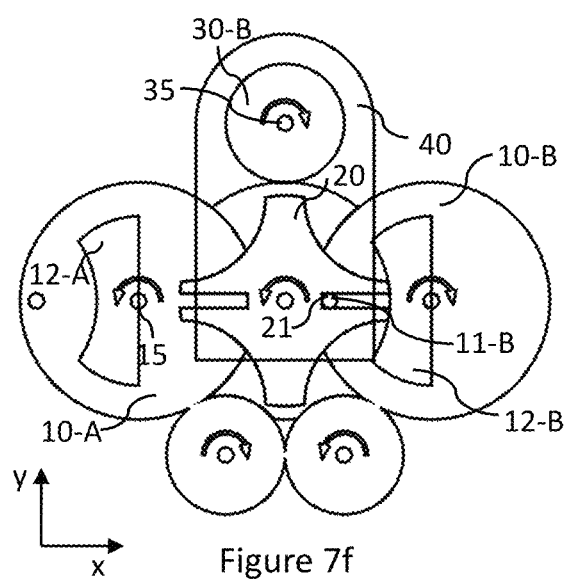
Figure 7G:
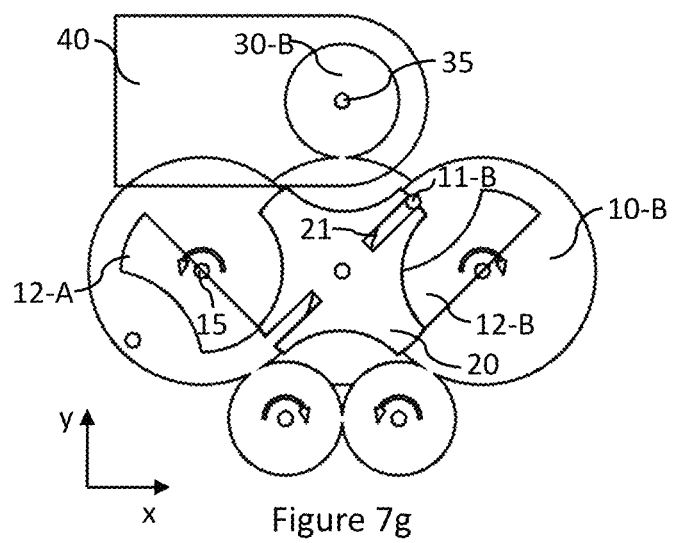

The FIG. 7f illustrates a sixth phase at moment t=t0+6d. This phase is mirrored in comparison to the second phase illustrated in the FIG. 7b: the effective drive wheel is different and therefore rotation directions of the driven wheel (20), gear wheels (30-A, 30-B) and the payload (40) are reversed from the second phase. The drive pin (11-B) of the second drive wheel (10-B) rotates the driven wheel (20), driving the first gearing wheel (30-A) in a counterclockwise rotating motion, which is conveyed to a clockwise rotation motion the second gearing wheel (30-B) that rotates the payload (40). At the shown point of time, the clockwise rotation motion of the payload (40) about its rotation axis (35), caused by the drive pin (11-B) of the second drive wheel (10-B) engaging to the radial slot (21) of the drive wheel (20), is half-way through, and this rotation continues as long as the drive pin (11-B) remains engaged with the radial slot (21). A concave portion at the outer circumference of the blocking disc (12-B) of the second drive wheel (10-B) allows undisturbed rotation of the driven wheel (20).

The FIG. 7e illustrates a seventh phase at moment t=t0+7d. This phase is mirrored in comparison to the third phase illustrated in the FIG. 7c. The drive pin (11-B) of the second drive wheel (10-B) is just about to exit the radial slot (21) of the driven wheel (20), which causes the driven wheel (20) to stop. Also gearing wheels (30-A, 30-B) stop, which causes the payload (40) to come to a stop in its current position, which is flipped, i.e. 180 degrees rotated, back to the initial position of the payload (40) shown in the FIG. 7a. At this phase, a convex portion of the outer circumference of the blocking disc (12-B) of the second drive wheel (10-B) has already engaged with a respective concave portion of the driven wheel (20), and convex portion of the blocking disc (12-A) of the first drive wheel (10-A) is just about to engage with an opposite concave portion of the driven wheel (20), which locks the driven wheel (20) temporarily in a fixed position, until the operation cycle returns in the first phase (FIG. 7a).

Although an aspect has been used as an example to explain operation of the Geneve drive mechanisms, a skilled person understands that the same operation principle discussed in connection with FIGS. 3, 5, 6 and 7a to 7g applies equally to other aspects.

The payload (40) preferably comprises at least one inertial sensor, such as a MEMS sensor. The MEMS sensor may be for example a gyroscope or an accelerometer. The 180-degree rotation angle according to the disclosed aspects is particularly suitable for maytagging purposes in a MEMS gyrocompass, in which case the MEMS sensor comprised in the payload (40) is at least one MEMS gyroscope. In maytagging, one or more gyroscopes of the gyrocompass should measure angular velocity about at least two orthogonal axes which are at least approximately parallel with lines extending along the surface of the Earth. The more gyroscopes are provided in the gyrocompass, the better signal to noise ratio can be achieved. Having N gyroscopes in a gyrocompass reduces white noise effect in the true north reading approximately by ratio $1/\sqrt{N}$. A 180-degree rotation angle is also useful in a process of compensating offset error of an acceleration sensor.

In general, the description of the aspects disclosed should be considered as being illustrative in all respects and not being restrictive. The scope of the present disclosure is shown by the claims rather than by the above description and is intended to include meanings equivalent to the claims and all changes in the scope. While preferred aspects of the invention have been described above, it is to be understood that variations and modifications will be apparent to those skilled in the art without departing from the scope and spirit of the invention.

The invention claimed is:

1. A drive mechanism comprising:
a plurality of circular drive wheels rotationally coupled to each other, wherein two of the plurality of circular drive wheels include a drive pin,
a drive motor coupled to one of the plurality of circular drive wheels, wherein the drive motor is configured to continuously rotate the respective drive wheel, and consequently all other drive wheels,
a driven wheel having two outwardly opening radial slots arranged symmetrically on opposite sides of the driven wheel, wherein the driven wheel is configured to be driven into an intermittent rotation motion about its central axis by drive pins of the two of the plurality of circular drive wheels alternately engaging with one of the radial slots, wherein direction of the intermittent rotation motion alternates between two consecutive rotation phases,
a first gearing wheel uniaxially coupled to the driven wheel,
a second gearing wheel rotationally coupled to the first gearing wheel, and
a payload uniaxially coupled to the second gearing wheel, wherein the second gearing wheel and the payload are configured to be rotated in a range of 160 to 200 degrees in a first direction during engagement of a first drive pin of a first drive wheel with one of the two outwardly opening radial slots.

2. The drive mechanism according to claim 1, wherein the second gearing wheel and the payload are configured to be rotated in the range of 170 to 190 degrees in the first direction.

3. The drive mechanism according to claim 2, wherein the second gearing wheel and the payload are configured to be rotated by 180 degrees in the first direction.

4. The drive mechanism according to claim 1, wherein the second gearing wheel and the payload are configured to be rotated in the range of 160 to 200 degrees in a second direction opposite to the first direction during engagement of a second drive pin of a second drive wheel with the other one of the two outwardly opening radial slots.

5. The drive mechanism according to claim 4, wherein the second gearing wheel and the payload are configured to be rotated in the range of 170 to 190 degrees in the second direction.

6. The drive mechanism according to claim 5, wherein the second gearing wheel and the payload are configured to be rotated by 180 degrees in the second direction.

7. The drive mechanism according to claim 1, wherein the driven wheel, the first gearing wheel, the second gearing wheel and the payload are stationary between intermittent rotations.

8. The drive mechanism according to claim 1, wherein the first drive wheel and the second drive wheel each comprise a blocking disc configured to disable rotation motion of the driven wheel between intermittent rotations.

9. The drive mechanism according to claim 8, wherein the blocking disc comprises a convex portion configured to engage with a respective concave portion of the driven wheel between said intermittent rotations for temporarily disabling rotation motion of the driven wheel.

10. The drive mechanism according to claim 1, wherein a gearing ratio of the first and second gearing wheels is 2:1 and wherein duty cycle of the drive mechanism is 50%.

11. An inertial sensor apparatus comprising:
a drive mechanism comprising:
a plurality of circular drive wheels rotationally coupled to each other, wherein two of the plurality of circular drive wheels include a drive pin,
a drive motor coupled to one of the plurality of circular drive wheels, wherein the drive motor is configured to continuously rotate the respective drive wheel, and consequently all other drive wheels,
a driven wheel having two outwardly opening radial slots arranged symmetrically on opposite sides of the driven wheel, wherein the driven wheel is configured to be driven into an intermittent rotation motion about its central axis by drive pins of the two of the plurality of circular drive wheels alternately engaging with one of the radial slots, wherein direction of the intermittent rotation motion alternates between two consecutive rotation phases,
a first gearing wheel uniaxially coupled to the driven wheel,
a second gearing wheel rotationally coupled to the first gearing wheel, and
a payload uniaxially coupled to the second gearing wheel,
wherein the second gearing wheel and the payload are configured to be rotated in a range of 160 to 200 degrees in a first direction during engagement of a first drive pin of a first drive wheel with one of the two outwardly opening radial slots;

wherein the drive mechanism is configured to rotate the payload by 180 degrees during each rotation period for maytagging at least one inertial sensor comprised in the payload.

12. The inertial sensor apparatus according to claim 11, wherein the payload comprises a MEMS gyroscope or a MEMS accelerometer.

13. The inertial sensor apparatus according to claim 12, wherein the inertial sensor apparatus is a MEMS gyrocompass.

14. The drive mechanism according to claim 11, wherein the second gearing wheel and the payload are configured to be rotated in the range of 170 to 190 degrees in the first direction.

15. The drive mechanism according to claim 14, wherein the second gearing wheel and the payload are configured to be rotated by 180 degrees in the first direction.

16. The drive mechanism according to claim 11, wherein the second gearing wheel and the payload are configured to be rotated in the range of 160 to 200 degrees in a second direction opposite to the first direction during engagement of a second drive pin of a second drive wheel with the other one of the two outwardly opening radial slots.

17. The drive mechanism according to claim 16, wherein the second gearing wheel and the payload are configured to be rotated in the range of 170 to 190 degrees in the second direction.

18. The drive mechanism according to claim 17, wherein the second gearing wheel and the payload are configured to be rotated by 180 degrees in the second direction.

19. The drive mechanism according to claim 11, wherein the driven wheel, the first gearing wheel, the second gearing wheel and the payload are stationary between intermittent rotations.

20. The drive mechanism according to claim 11, wherein the first drive wheel and the second drive wheel each comprise a blocking disc configured to disable rotation motion of the driven wheel between intermittent rotations.

* * * * *